United States Patent
Sekine et al.

(10) Patent No.: US 11,180,669 B2
(45) Date of Patent: *Nov. 23, 2021

(54) RADIATION-CURABLE INK JET COMPOSITION AND RECORDING METHOD

(71) Applicant: Seiko Epson Corporation, Tokyo (JP)

(72) Inventors: Midori Sekine, Matsumoto (JP); Kyohei Tanaka, Matsumoto (JP); Keitaro Nakano, Matsumoto (JP)

(73) Assignee: Seiko Epson Corporation

(*) Notice: Subject to any disclaimer, the term of this patent is extended or adjusted under 35 U.S.C. 154(b) by 0 days.

This patent is subject to a terminal disclaimer.

(21) Appl. No.: 16/784,996

(22) Filed: Feb. 7, 2020

(65) Prior Publication Data

US 2020/0255679 A1 Aug. 13, 2020

(30) Foreign Application Priority Data

Feb. 8, 2019 (JP) .............................. JP2019-021368

(51) Int. Cl.

| | |
|---|---|
| *C08F 2/46* | (2006.01) |
| *C08F 2/50* | (2006.01) |
| *C08G 61/04* | (2006.01) |
| *C09D 11/101* | (2014.01) |
| *C09D 11/324* | (2014.01) |
| *C09D 11/106* | (2014.01) |
| *C08F 220/20* | (2006.01) |
| *C08F 220/18* | (2006.01) |
| *C08F 226/06* | (2006.01) |
| *C08L 47/00* | (2006.01) |
| *B41J 2/435* | (2006.01) |

(52) U.S. Cl.
CPC ............. *C09D 11/101* (2013.01); *B41J 2/435* (2013.01); *C08F 220/1806* (2020.02); *C08F 220/1811* (2020.02); *C08F 220/20* (2013.01); *C08F 226/06* (2013.01); *C08L 47/00* (2013.01); *C09D 11/106* (2013.01); *C09D 11/324* (2013.01); *C08L 2312/06* (2013.01)

(58) Field of Classification Search
CPC .... C08L 47/00; C08L 2312/06; C09D 11/106; C09D 11/324; C09D 11/101; C09D 11/322; C09D 4/00; C08F 226/06; C08F 220/301; C08F 220/1811; C08F 220/20; C08F 220/1806; C08F 220/58; C08F 220/45; C08F 220/11; C08F 222/102; B41J 2/435
USPC .................................................. 522/1; 520/1
See application file for complete search history.

(56) References Cited

U.S. PATENT DOCUMENTS

| | | | |
|---|---|---|---|
| 8,137,793 B2 | 3/2012 | Kameyama et al. | |
| 2013/0260092 A1 | 10/2013 | Araki et al. | |
| 2016/0102216 A1 | 4/2016 | Hirade et al. | |
| 2016/0312052 A1* | 10/2016 | Cong ..................... | C09D 11/38 |
| 2017/0058135 A1 | 3/2017 | Kohzuki et al. | |
| 2018/0002552 A1 | 1/2018 | Nakano et al. | |
| 2020/0254784 A1* | 8/2020 | Sato ....................... | B41J 11/002 |
| 2020/0255677 A1* | 8/2020 | Tanaka ................... | C09D 11/30 |
| 2020/0255678 A1* | 8/2020 | Sekine ................. | C09D 11/106 |
| 2020/0255682 A1* | 8/2020 | Tanaka ............... | B41J 11/00214 |
| 2020/0392353 A1* | 12/2020 | Tanaka ................... | C09D 11/38 |
| 2020/0392357 A1* | 12/2020 | Sekine ................... | B41J 11/002 |
| 2021/0071024 A1* | 3/2021 | Tanaka ................. | C09D 11/322 |

FOREIGN PATENT DOCUMENTS

| | | | | |
|---|---|---|---|---|
| JP | 2010-235914 A | 10/2010 | | |
| JP | 2012-162688 A | 8/2012 | | |
| JP | 2013-079383 A | 5/2013 | | |
| JP | 2015-178609 A | 10/2015 | | |
| JP | 2018-009142 A | 1/2018 | | |
| WO | WO-2015140538 A1 * | 9/2015 | ............. | C09D 11/38 |

* cited by examiner

*Primary Examiner* — Jessica Whiteley
(74) *Attorney, Agent, or Firm* — Harness, Dickey & Pierce, P.L.C.

(57) ABSTRACT

A radiation-curable ink jet composition comprises a polymerizable compound component including a monofunctional monomer component and a multifunctional monomer component. The content of the monofunctional monomer component is 87 mass % or more based on the polymerizable compound. The monofunctional monomer component includes a nitrogen-containing monofunctional monomer component, and the content of the nitrogen-containing monofunctional monomer component is 14 mass % or less based on total amount of the radiation-curable ink jet composition. The weighted average of the glass transition temperatures of homopolymers of the respective polymerizable compounds is 42° C. or more when the mass ratios of the contents of the respective polymerizable compounds are weighted.

10 Claims, No Drawings

RADIATION-CURABLE INK JET COMPOSITION AND RECORDING METHOD

The present application is based on, and claims priority from JP Application Serial Number 2019-021368, filed Feb. 8, 2019, the disclosure of which is hereby incorporated by reference herein in its entirety.

BACKGROUND

1. Technical Field

The present disclosure relates to a radiation-curable ink jet composition and a recording method.

2. Related Art

Radiation-curable ink jet compositions exhibiting good curability and flexibility after curing have been studied as described in, for example, JP-A-2018-9142. Specifically, Example 9 (Table 3) thereof describes a radiation-curable ink jet composition including phenoxyethyl acrylate: 39 mass %, acryloylmorpholine: 20 mass %, n-vinylcaprolactam: 15 mass %, 2-(2-vinyloxyethoxy)ethyl acrylate: 10 mass %, and difunctional urethane acrylate, as monomers.

However, the radiation-curable ink jet composition described in JP-A-2018-9142 has a problem that when it is used in sign application, the flexibility and adhesion of a coating film tend to be insufficient. In addition, it has been found that an increase in the ratio of the amount of monofunctional monomers to the total amount of monomers for enhancing the flexibility and adhesion has a problem that the increase may reduce the scratch resistance and color development properties of the coating film.

SUMMARY

The present disclosure provides a radiation-curable ink jet composition including a polymerizable compound component that includes a monofunctional monomer component and a multifunctional monomer component, wherein the content of the monofunctional monomer component is 87 mass % or more based on the total amount of the polymerizable compound component, the monofunctional monomer component includes a nitrogen-containing monofunctional monomer component, the content of the nitrogen-containing monofunctional monomer component is 14 mass % or less based on the total amount of the radiation-curable ink jet composition, and the weighted average of the glass transition temperatures of homopolymers of the respective polymerizable compounds is 42° C. or more when the mass ratios of the contents of the respective polymerizable compounds are weighted.

In the radiation-curable ink jet composition, the nitrogen-containing monofunctional monomer component may include a monomer having a nitrogen-containing heterocyclic structure.

In the radiation-curable ink jet composition, the content of the multifunctional monomer component may be 1 to 10 mass % based on the total amount of the polymerizable compound component.

In the radiation-curable ink jet composition, the multifunctional monomer component may include a vinyl ether group-containing (meth)acrylic ester represented by the following formula (1):

$$CH_2=CR^1-COOR^2-O-CH=CH-R^3 \quad (1)$$

(where, $R^1$ is a hydrogen atom or a methyl group, $R^2$ is a divalent C2-C20 organic residue, $R^3$ is a hydrogen atom or a monovalent C1-C11 organic residue).

In the radiation-curable ink jet composition, the content of the nitrogen-containing monofunctional monomer component may be 3 to 14 mass % based on the total amount of the radiation-curable ink jet composition.

In the radiation-curable ink jet composition, the nitrogen-containing monofunctional monomer component may include a nitrogen-containing monofunctional acrylate monomer.

In the radiation-curable ink jet composition, the nitrogen-containing monofunctional monomer component may include a nitrogen-containing monofunctional vinyl monomer.

In the radiation-curable ink jet composition, the monofunctional monomer component may include a monofunctional acrylate containing a polycyclic hydrocarbon group.

In the radiation-curable ink jet composition, the content of the monofunctional acrylate containing a polycyclic hydrocarbon group may be 40 mass % or less based on the total amount of the radiation-curable ink jet composition.

The radiation-curable ink jet composition may contain a pigment.

A recording method of the present disclosure includes a discharge step of discharging the radiation-curable ink jet composition from an ink jet head to adhere the composition to a recording medium and an irradiation step of irradiating the radiation-curable ink jet composition adhered to the recording medium with radioactive rays.

DESCRIPTION OF EXEMPLARY EMBODIMENTS

Embodiments of the present disclosure (hereinafter, referred to as "the present embodiment") will now be described in detail, but the present disclosure is not limited thereto and can be variously modified within a range not changing the gist of the present disclosure.

In the present specification, the term "(meth)acryloyl" means acryloyl and/or methacryloyl corresponding to the acryloyl. The term "(meth)acrylate" means acrylate and/or methacrylate corresponding to the acrylate. The term "(meth)acryl" means acryl and/or methacryl corresponding to the acryl.

1. Radiation-Curable Ink Jet Composition

The radiation-curable ink jet composition according to the present embodiment (hereinafter, also simply referred to as "composition") includes a polymerizable compound component that includes a monofunctional monomer component and a multifunctional monomer component. The content of the monofunctional monomer component is 87 mass % or more based on the total amount of the polymerizable compound component, the monofunctional monomer component includes a nitrogen-containing monofunctional monomer component, the content of the nitrogen-containing monofunctional monomer component is 14 mass % or less based on the total amount of the radiation-curable ink jet composition, and the weighted average of the glass transition temperatures of homopolymers of the respective polymerizable compounds is 42° C. or more when the mass ratios of the contents of the respective polymerizable compounds are weighted.

In the present embodiment, the flexibility and adhesion of the coating film can be improved by thus controlling the content of the monofunctional monomer component within a predetermined range. At the same time, when the content of the monofunctional monomer component is within the above-mentioned range, the scratch resistance of the coating film is reduced. However, the scratch resistance of the coating film can also be improved by using the polymerizable compound component having a weighted average of the glass transition temperatures of homopolymers of the respective polymerizable compounds within a predetermined range. Furthermore, odor is likely to occur when the contents of the functional monomers within the above-mentioned ranges. However, regarding to this problem, the odor can be prevented by using the nitrogen-containing monofunctional monomer component.

The radiation-curable ink jet composition according to the present embodiment is a composition to be used by being discharged from an ink jet head by an ink jet method. Although a radiation-curable ink composition will now be described as an embodiment of the radiation-curable ink jet composition, the composition according to the present embodiment may be a composition other than ink compositions, such as a composition to be used for 3D molding.

The radiation-curable ink jet composition of the present embodiment is cured by irradiation with radioactive rays. Examples of the radioactive rays include ultraviolet rays, infrared rays, visible rays, and X-rays. The radioactive rays may be ultraviolet rays because its radiation source is easily available and widely used and because a material suitable for curing by irradiation with ultraviolet rays is easily available and widely used.

The components and physical properties of the radiation-curable ink jet composition according to the present embodiment and a method for manufacturing the composition will now be described.

1.1. Polymerizable Compound Component

The polymerizable compound component includes a monofunctional monomer component having one polymerizable functional group and a multifunctional monomer component having multiple polymerizable functional groups and may include an oligomer having one or multiple polymerizable functional groups as necessary. The respective polymerizable compounds may be used alone or in combination of two or more thereof.

In the present embodiment, the weighted average of the glass transition temperatures of homopolymers of the respective polymerizable compounds is 42° C. or more when the mass ratios of the contents of the respective polymerizable compounds are weighted and may be 44° C. or more or 46° C. or more. When the weighted average of glass transition temperatures is 42° C. or more, the scratch resistance of the coating film at room temperature can be enhanced. The upper limit of the weighted average of glass transition temperatures is not particularly limited and may be 60° C. or less, 55° C. or less, or 50° C. or less.

A method for calculating the weighted average of glass transition temperatures will be described. In the description, the weighted average value of glass transition temperatures is represented by $Tg_{All}$, the glass transition temperature of a homopolymer of a polymerizable compound is represented by $Ig_N$, and the mass ratio of the content of the polymerizable compound is represented by $X_N$ (mass %), where N is a sequential number starting from 1 according to the types of the polymerizable compounds contained in the radiation-curable ink jet composition. For example, when three types of polymerizable compounds are used, $Tg_1$, $Tg_2$, and $Tg_3$ are generated. The glass transition temperature of a homopolymer of a polymerizable compound can be obtained from the safety data sheet (SDS) or catalog of the polymerizable compound. The weighted average $Tg_{All}$ of glass transition temperatures is the sum total of the respective products of each glass transition temperature $Tg_N$ calculated for each polymerizable compound and its content $X_N$ and is accordingly represented by the following expression (2):

$$Tg_{All} = \Sigma Tg_N \times X_N \quad (2).$$

Incidentally, the weighted average of glass transition temperatures can be adjusted by the glass transition temperatures of the respective polymerizable compounds to be used and the mass ratios of the contents of the respective polymerizable compounds to be used.

1.1.1. Monofunctional Monomer Component

The monofunctional monomer component of the present embodiment includes a nitrogen-containing monofunctional monomer component and may include another monofunctional monomer as necessary. The optional monofunctional monomer may be any monofunctional monomer and can be a known monofunctional monomer containing a polymerizable functional group, in particular, a polymerizable functional group having an unsaturated carbon double bond.

The content of the monofunctional monomer component is 87 mass % or more based on the total amount of the polymerizable compound component and may be 90 mass % or more, 94 mass % or more, or 96 mass % or more. When the content of the monofunctional monomer component is 87 mass % or more based on the total amount of the polymerizable compound component, the flexibility and adhesion of the coating film are further improved. In addition, the upper limit of the content of the monofunctional monomer component is not particularly limited and may be 99 mass % or less, 98 mass % or less, or 97 mass % or less based on the total amount of the polymerizable compound component. When the content of the monofunctional monomer component is 99 mass % or less based on the total amount of the polymerizable compound component, the scratch resistance of the coating film tends to be further improved.

The content of the monofunctional monomer component may be 78 mass % or more, 80 mass % or more, or 82 mass % or more based on the total amount of the composition. When the content of the monofunctional monomer component is 78 mass % or more based on the total amount of the composition, the flexibility and adhesion of the coating film tend to be further improved. In addition, the upper limit of the content of the monofunctional monomer component may be 92 mass % or less, 90 mass % or less, or 88 mass % or less based on the total amount of the composition. When the content of the monofunctional monomer component is 90 mass % or less based on the total amount of the composition, the scratch resistance of the coating film tends to be further improved.

Examples of the monofunctional monomer are shown below, but the monofunctional monomers in the present embodiment are not limited to the following examples.

1.1.1.1. Nitrogen-Containing Monofunctional Monomer

The nitrogen-containing monofunctional monomer is not particularly limited, and examples thereof include nitrogen-containing monofunctional vinyl monomers, such as N-vinylcaprolactam, N-vinylformamide, N-vinylcarbazole, N-vinylacetamide, and N-vinylpyrrolidone; nitrogen-containing monofunctional acrylate monomers, such as acryloylmorpholine; and nitrogen-containing monofunctional acrylamide monomers, such as (meth)acrylamide, N-hydroxymethyl(meth)acrylamide, diacetone acrylamide, N,N-dimethyl(meth)acrylamide, and (meth)acrylamides such as a dimethylaminoethylacrylate benzyl chloride quaternary salt.

In particular, the nitrogen-containing monofunctional monomer component may include either a nitrogen-containing monofunctional vinyl monomer or a nitrogen-containing monofunctional acrylate monomer, or may include a monomer having a nitrogen-containing heterocyclic structure, such as N-vinylcaprolactam, N-vinylcarbazole, N-vinylpyrrolidone, or acryloylmorpholine, or may include either N-vinylcaprolactam or acryloylmorpholine.

The scratch resistance of the coating film tends to be further improved by using such a nitrogen-containing monofunctional monomer component. Furthermore, a nitrogen-containing monofunctional vinyl monomer having a nitrogen-containing heterocyclic structure, such as N-vinylcaprolactam, further improves the flexibility of the coating film, and a nitrogen-containing monofunctional acrylate monomer having a nitrogen-containing heterocyclic structure, such as acryloylmorpholine, tends to further reduce the odor of the composition.

The content of the nitrogen-containing monofunctional monomer component may be 1 to 25 mass %, 5 to 20 mass %, or 10 to 15 mass % based on the total amount of the polymerizable compound component. When the content of the nitrogen-containing monofunctional monomer component is within the above-mentioned range, the odor is reduced, and the scratch resistance of the coating film tends to be further improved.

The content of the nitrogen-containing monofunctional monomer component is 14 mass % or less and may be 3 to 14 mass %, 12 mass % or less, 3 to 12 mass %, or 5 to 12 mass % based on the total amount of the composition. When the content of the nitrogen-containing monofunctional monomer component is 14 mass % or less based on the total amount of the composition, the adhesion is further improved. In addition, when the content of the nitrogen-containing monofunctional monomer component is 3 mass % or more based on the total amount of the composition, the odor is reduced, and the scratch resistance of the coating film tends to be further improved.

1.1.1.2. Monofunctional Acrylate Containing Polycyclic Hydrocarbon Group

An example of the optional monofunctional monomer is a monofunctional acrylate containing a polycyclic hydrocarbon group. The monofunctional acrylate containing a polycyclic hydrocarbon group may be any monofunctional acrylate including multiple cyclic hydrocarbons in the structure, and examples thereof include acrylates containing unsaturated polycyclic hydrocarbon groups, such as dicyclopentenyl acrylate and dicyclopentenyloxyethyl acrylate; and acrylates containing saturated polycyclic hydrocarbon groups, such as dicyclopentanyl acrylate and isobornyl acrylate. In particular, the monofunctional acrylate containing a polycyclic hydrocarbon group may be an acrylate containing an unsaturated polycyclic hydrocarbon group, such as dicyclopentenyl acrylate. When such a monofunctional acrylate containing a polycyclic hydrocarbon group is used, the scratch resistance of the coating film and the flexibility and adhesion of the coating film tend to be further improved. In addition, the adhesion tends to be further improved by using an acrylate containing an unsaturated polycyclic hydrocarbon group.

The content of the monofunctional acrylate containing a polycyclic hydrocarbon group may be 20 to 55 mass %, 25 to 50 mass %, or 30 to 45 mass % based on the total amount of the polymerizable compound component. When the content of the monofunctional acrylate containing a polycyclic hydrocarbon group is 20 mass % or more based on the total amount of the polymerizable compound component, the scratch resistance of the coating film tends to be further improved. In addition, when the content of the monofunctional acrylate containing a polycyclic hydrocarbon group is 55 mass % or less based on the total amount of the polymerizable compound component, the odor tends to be further prevented.

The content of the monofunctional acrylate containing a polycyclic hydrocarbon group may be 50 mass % or less or 40 mass % or less or 20 to 40 mass % or 25 to 40 mass % based on the total amount of the composition. When the content of the monofunctional acrylate containing a polycyclic hydrocarbon group is 50 mass % or less, the odor tends to be further prevented. In addition, when the content of the monofunctional acrylate containing a polycyclic hydrocarbon group is 20 mass % or more, the scratch resistance of the coating film tends to be further improved.

1.1.1.3. Aromatic Group-Containing Monofunctional Monomer

An example of the optional monofunctional monomer is an aromatic group-containing monofunctional monomer. Incidentally, in the present embodiment, examples of the aromatic group-containing monofunctional monomer do not include a compound containing a polycyclic hydrocarbon group.

The aromatic group-containing monofunctional monomer is not particularly limited, and examples thereof include phenoxyethyl (meth)acrylate, benzyl (meth)acrylate, alkoxylated 2-phenoxyethyl (meth)acrylate, ethoxylated nonylphenyl (meth)acrylate, alkoxylated nonylphenyl (meth)acrylate, p-cumylphenol EO-modified (meth)acrylate, and 2-hydroxy-3-phenoxypropyl (meth)acrylate. In particular, the aromatic group-containing monofunctional monomer may be phenoxyethyl (meth)acrylate or benzyl (meth)acrylate, in particular, phenoxyethyl (meth)acrylate, especially phenoxyethyl acrylate (PEA). When such an aromatic group-containing monofunctional monomer is used, the solubility of a polymerization initiator is further improved, and the curability of the composition tends to be further improved. In particular, when an acylphosphine oxide-based polymerization initiator and a thioxanthone-based polymerization initiator are used, the solubility tends to be improved. In addition, when phenoxyethyl (meth)acrylate is used, the odor tends to be further reduced.

In another expression of the aromatic group-containing monofunctional monomer, examples of the aromatic group-containing monofunctional monomer include compounds represented by the following formula (3) and compounds represented by the following formula (4):

$$CH_2=CR^4-COOR^5-Ar \qquad (3)$$

$$CH_2=CR^4-COO-Ar \qquad (4)$$

(in the formulae (3) and (4), $R^4$ is a hydrogen atom or a methyl group; in the formula (3), Ar representing an aromatic ring skeleton is a monovalent organic residue that includes at least one aryl group and binds to the group represented by $R^5$ via a carbon atom of the aryl group, and $R^5$ is a divalent C1-C4 organic residue; and in the formula (4), Ar representing an aromatic ring skeleton is a monovalent organic residue that includes at least one aryl group and binds to —COO— in the formula via a carbon atom of the aryl group).

In the formula (3), examples of the group represented by $R^5$ include an optionally substituted linear, branched, or cyclic C1-C4 alkylene group and an optionally substituted C1-C4 alkylene group having an oxygen atom forming an ether bond and/or an ester bond in the structure. In particular, the group may be a C1-C4 alkylene group, such as an ethylene group, an n-propylene group, an isopropylene group, or a butylene group; or a C1-C4 alkylene group having an oxygen atom forming an ether bond in the structure, such as an oxyethylene group, an oxy-n-propylene group, an oxyisopropylene group, or an oxybutylene group. When the organic residue is an optionally substituted group, the substituent may be any group, and examples thereof include a carboxyl group, an alkoxy group, a hydroxy group, and a halo group. When the substituent is a group containing a carbon atom, the carbon atom is counted as the carbon atom of the organic residue.

In the formulae (3) and (4), examples of the or each aryl group included in the Ar (aryl) (aromatic ring skeleton) include, but not limited to, a phenyl group and a naphthyl group. The number of the aryl group is one or more and may be one or two. In the carbon atoms constituting the aryl group, a carbon atom, other than the carbon atom binding to the organic residue represented by $R^5$ in the formula (3), the carbon atom binding to —COO— in the formula (4), and a carbon atom binding between aryl groups when multiple aryl groups are present, may be substituted. The number of substitution per aryl group is one or more and may be one or two. Examples of the substituent include, but not limited to, linear, branched, or cyclic C1-C10 alkyl and alkoxy groups, a carboxyl group, a halo group, and a hydroxy group.

The content of the aromatic group-containing monofunctional monomer may be 25 to 60 mass %, 30 to 55 mass %, or 35 to 50 mass % based on the total amount of the polymerizable compound component. When the content of the aromatic group-containing monofunctional monomer is 25 mass % or more based on the total amount of the polymerizable compound component, the odor tends to be further prevented. In addition, when the content of the aromatic group-containing monofunctional monomer is 60 mass % or less based on the total amount of the polymerizable compound component, the scratch resistance of the coating film tends to be further improved.

The content of the aromatic group-containing monofunctional monomer may be 20 to 55 mass %, 25 to 50 mass %, or 30 to 45 mass % based on the total amount of the composition. When the content of the aromatic group-containing monofunctional monomer is 20 mass % or more based on the total amount of the composition, the odor tends to be further prevented. In addition, when the content of the aromatic group-containing monofunctional monomer is 55 mass % or less based on the total amount of the composition, the scratch resistance of the coating film tends to be further improved.

1.1.1.4. Saturated Aliphatic Group-Containing Monofunctional Monomer

An example of the optional monofunctional monomer is a saturated aliphatic group-containing monofunctional monomer. Incidentally, in the present embodiment, examples of the saturated aliphatic group-containing monofunctional monomer do not include a compound containing a polycyclic hydrocarbon group.

The saturated aliphatic group-containing monofunctional monomer is not particularly limited, and examples thereof include alicyclic group-containing monofunctional monomers, such as tert-butylcyclohexanol acrylate (TBCHA) and 2-(meth)acrylic acid-1,4-dioxaspiro[4,5]dec-2-ylmethyl; linear or branched aliphatic group-containing monofunctional monomers, such as isoamyl (meth)acrylate, stearyl (meth)acrylate, lauryl (meth)acrylate, octyl (meth)acrylate, decyl (meth)acrylate, isodecyl (meth)acrylate, isomyristyl (meth)acrylate, isostearyl (meth)acrylate, 2-hydroxybutyl (meth)acrylate, butoxyethyl (meth)acrylate, tetrahydrofurfuryl (meth)acrylate, 2-hydroxyethyl (meth)acrylate, and 2-hydroxypropyl (meth)acrylate; and lactone-modified flexible (meth)acrylate. In particular, the saturated aliphatic group-containing monofunctional monomer may be an alicyclic group-containing monofunctional monomer. The curability of the composition tends to be further improved by using such a saturated aliphatic group-containing monofunctional monomer.

The content of the saturated aliphatic group-containing monofunctional monomer may be 2.5 to 17.5 mass %, 5 to 15 mass %, or 7.5 to 12.5 mass % based on the total amount of the polymerizable compound component.

The content of the saturated aliphatic group-containing monofunctional monomer may be 1 to 10 mass %, 2 to 7.5 mass %, or 2.5 to 5 mass % based on the total amount of the composition.

1.1.1.5. Others

In addition to the above, other examples of the optional monofunctional monomer include unsaturated carboxylic acids, such as (meth)acrylic acid, itaconic acid, crotonic acid, isocrotonic acid, and maleic acid; salts of the unsaturated carboxylic acids; unsaturated carboxylic esters, urethanes, amides, and anhydrides; acrylonitrile, styrene, various unsaturated polyesters, unsaturated polyethers, unsaturated polyamides, and unsaturated urethanes.

1.1.2. Multifunctional Monomer Component

Examples of the multifunctional monomer of the present embodiment include, but not limited to, vinyl ether group-containing (meth)acrylate, difunctional (meth)acrylate, and tri- or higher multifunctional (meth)acrylate.

The content of the multifunctional monomer component may be 0.5 mass % or more, 1 mass % or more, or 2 mass % or more based on the total amount of the polymerizable compound component. When the content of the multifunctional monomer component is 0.5 mass % or more based on the total amount of the polymerizable compound component, the scratch resistance tends to be further improved. In addition, the upper limit of the content of the multifunctional monomer component may be 10 mass % or less, 7.5 mass % or less, or 5 mass % or less based on the total amount of the polymerizable compound component. When the content of the multifunctional monomer component is 10 mass % or less based on the total amount of the polymerizable compound component, the flexibility and adhesion of the coating film tend to be further improved.

The content of the multifunctional monomer component may be 0.5 mass % or more, 1 mass % or more, or 2 mass % or more based on the total amount of the composition. When the content of the multifunctional monomer component is 0.5 mass % or more based on the total amount of the composition, the scratch resistance tends to be further improved. In addition, the upper limit of the content of the multifunctional monomer component may be 10 mass % or less, 7.5 mass % or less, or 5 mass % or less based on the total amount of the composition. When the content of the multifunctional monomer component is 10 mass % or less based on the total amount of the composition, the flexibility and adhesion of the coating film tend to be further improved.

Examples of the multifunctional monomer are shown below, but the multifunctional monomer in the present embodiment is not limited to the following examples.

1.1.2.1. Vinyl Ether Group-Containing (Meth)Acrylate

The vinyl ether group-containing (meth)acrylate is not particularly limited, and examples thereof include compounds represented by the following formula (1). When such a vinyl ether group-containing (meth)acrylate is included, the viscosity of the composition decreases, and the discharge stability tends to be further improved. In addition, the curability of the composition is further improved, and also the recording speed can be further increased with the improvement of the curability.

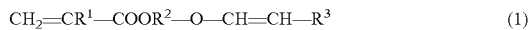

$$CH_2=CR^1-COOR^2-O-CH=CH-R^3 \quad (1)$$

(where, $R^1$ is a hydrogen atom or a methyl group, $R^2$ is a divalent C2-C20 organic residue, and $R^3$ is a hydrogen atom or a monovalent C1-C11 organic residue).

In the formula (1), examples of the divalent C2-C20 organic residue represented by $R^2$ include an optionally substituted linear, branched, or cyclic C2-C20 alkylene group, an optionally substituted C2-C20 alkylene group having an oxygen atom forming an ether bond and/or an ester bond in the structure, and an optionally substituted divalent C6-C11 aromatic group. In particular, the divalent C2-C20 organic residue may be a C2-C6 alkylene group, such as an ethylene group, an n-propylene group, an isopropylene group, or a butylene group; or a C2-C9 alkylene group having an oxygen atom forming an ether bond in the structure, such as an oxyethylene group, an oxy-n-propylene group, an oxyisopropylene group, or an oxybutylene group. Furthermore, from the viewpoint of being capable of further reducing the viscosity of the composition and further improving the curability of the composition, the vinyl ether group-containing (meth)acrylate may be a compound having a glycol ether chain, in which $R^2$ is a C2-C9 alkylene group having an oxygen atom forming an ether bond in the structure, such as an oxyethylene group, an oxy-n-propylene group, an oxyisopropylene group, or an oxybutylene group.

In the formula (1), the monovalent C1-C11 organic residue represented by $R^3$ may be an optionally substituted linear, branched, or cyclic C1-C10 alkyl group or an optionally substituted C6-C11 aromatic group. In particular, the monovalent C1-C11 organic residue may be a C1-C2 alkyl group, i.e., a methyl group or an ethyl group or a C6-C8 aromatic group, such as a phenyl group or a benzyl group.

When each of the above-described organic residues is an optionally substituted group, the substituents are divided into groups containing carbon atoms and groups not containing carbon atoms. When the substituent is a group containing a carbon atom, the carbon atom is counted as the carbon atom of the organic residue. Examples of the group containing a carbon atom include, but not limited to, a carboxyl group and an alkoxy group. When the substituent is a group not containing a carbon atom, examples thereof include, but not limited to, a hydroxy group and a halo group.

Examples of the compound represented by the formula (1) include, but not limited to, 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylate1,1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 6-vinyloxyhexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl, 2-(2-vinyloxyethoxy)ethyl (meth) acrylate, 2-(vinyloxyisopropoxy)ethyl (meth)acrylate, 2-(vinyloxyethoxy)propyl (meth)acrylate, 2-(vinyloxyethoxy)isopropyl (meth)acrylate, 2-(vinyloxyisopropoxy) propyl (meth)acrylate, 2-(vinyloxyisopropoxy) isopropyl (meth) acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy) propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy) isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxy)ethyl (meth)acrylate, 2-(isopropenoxyethoxyethoxyethoxy)ethyl (meth) acrylate, polyethylene glycol monovinyl ether (meth)acrylate, and polypropylene glycol monovinyl ether (meth) acrylate. In particular, the compound may be 2-(2-vinyloxyethoxy)ethyl acrylate because it is easy to balance between the curability and the viscosity of the composition. Incidentally, in the present embodiment, 2-(2-vinyloxyethoxy)ethyl acrylate may also be referred to as VEEA.

The content of the vinyl ether group-containing (meth)acrylate may be 0.5 to 10 mass %, 1 to 7.5 mass %, or 2 to 5 mass % based on the total amount of the polymerizable compound component. When the content of the vinyl ether group-containing (meth)acrylate based on the total amount of the polymerizable compound component is within the above-mentioned range, the viscosity of the composition decreases, and the discharge stability tends to be further improved.

The content of the vinyl ether group-containing (meth) acrylate may be 0.5 to 10 mass %, 1 to 7.5 mass %, or 2 to 5 mass % based on the total amount of the composition. When the content of the vinyl ether group-containing (meth) acrylate based on the total amount of the composition is within the above-mentioned range, the viscosity of the composition decreases, and the discharge stability tends to be further improved.

1.1.2.2. Difunctional (meth)acrylate

The difunctional (meth)acrylate is not particularly limited, and examples thereof include dipropylene glycol diacrylate (DPGDA), diethylene glycol di(meth)acrylate, triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, bisphenol A EO (ethylene oxide) adduct di(meth)acrylate, bisphenol A PO (propylene oxide) adduct di(meth)acrylate, hydroxypivalic acid neopentyl glycol di(meth)acrylate, and polytetramethylene glycol di(meth)acrylate.

1.1.2.3. Tri- or Higher Multifunctional (Meth)Acrylate

The tri- or higher multifunctional (meth)acrylate is not particularly limited, and examples thereof include trimethylolpropane tri(meth)acrylate, EO-modified trimethylolpropane tri(meth)acrylate, pentaerythritol tri(meth)acrylate, pentaerythritol tetra(meth)acrylate, dipentaerythritol hexa (meth)acrylate, ditrimethylolpropane tetra(meth)acrylate, glycerin propoxy tri(meth)acrylate, caprolactone-modified trimethylolpropane tri(meth)acrylate, pentaerythritolethoxy tetra(meth)acrylate, and caprolactone-modified dipentaerythritol hexa(meth)acrylate.

1.2.3. Oligomer

The oligomer of the present embodiment is a compound that is a multimer, such as a dimer and a trimer, having a polymerizable compound as a constituent component and has one or more polymerizable functional groups. Incidentally, the polymerizable compound herein is not limited to the above-described monofunctional monomers and multifunctional monomers. In the present embodiment, those having a molecular weight of 1000 or more are defined as oligomers, and those having a molecular weight of less than 1000 are defined as monomers.

These oligomers are not particularly limited, and examples thereof include a urethane acrylate oligomers having a repeating structure of urethane, a polyester acrylate oligomer having a repeating structure of ester, and an epoxy acrylate oligomer having a repeating structures of epoxy.

Among these oligomers, the oligomer may be a urethane acrylate oligomer, or an aliphatic urethane acrylate oligomer or an aromatic urethane acrylate oligomer, in particular, an aliphatic urethane acrylate oligomer. The urethane acrylate oligomer may be a tetra- or lower functional urethane acrylate oligomer or a difunctional urethane acrylate oligomer.

The use such an oligomer further improves the storage stability of the composition and tends to further improve the scratch resistance.

The content of the oligomer may be 1 to 10 mass %, 3 to 9 mass %, or 5 to 7 mass % based on the total amount of the polymerizable compound component. When the content of the oligomer based on the total amount of the polymerizable compound component is within the above-mentioned range, the storage stability of the composition is further improved, and the scratch resistance of the coating film tends to be further improved.

The content of the oligomer may be 1 to 10 mass %, 3 to 9 mass %, or 5 to 7 mass % based on the total amount of the composition. When the content of the oligomer based on the total amount of the composition is within the above-mentioned range, the storage stability of the composition is further improved, and the scratch resistance of the coating film tends to be further improved.

1.2. Polymerization Initiator

The radiation-curable ink jet composition according to the present embodiment may contain a polymerization initiator that generates an active species when irradiated with radioactive rays. As the polymerization initiator, a single polymerization initiator may be used, or two or more polymerization initiators may be used.

The polymerization initiator is not particularly limited, and examples thereof include known polymerization initiators, such as an acylphosphine oxide-based polymerization initiator, an alkylphenone-based polymerization initiator, a titanocene-based polymerization initiator, and a thioxanthone-based polymerization initiator. In particular, the polymerization initiator may be an acylphosphine oxide-based polymerization initiator. The use of such a polymerization initiator further improves the curability of the composition and tends to further improve the curability in the curing process by, in particular, light from a UV-LED.

The acylphosphine oxide-based polymerization initiator is not particularly limited, and examples thereof include 2,4,6-trimethylbenzoyl diphenylphosphine oxide, bis(2,4,6-trimethylbenzoyl)-phenylphosphine oxide, and bis-(2,6-dimethoxybenzoyl)-2,4,4-trimethylpentylphosphine oxide.

Examples of commercial products of the acylphosphine oxide-based polymerization initiator include IRGACURE 819 (bis(2,4,6-trimethylbenzoyl)-phenylphosphine oxide), IRGACURE 1800 (a mixture of bis-(2,6-dimethoxybenzoyl)-2,4,4-trimethylpentylphosphine oxide and 1-hydroxycyclohexyl-phenylketone at a mass ratio of 25:75), and IRGACURE TPO (2,4,6-trimethylbenzoyl diphenylphosphine oxide) (these products are all manufactured by BASF SE).

The content of the polymerization initiator may be 1 to 20 mass %, 3 to 15 mass %, 5 to 10 mass %, or 7 to 9 mass % based on the total amount of the composition. When the content of the polymerization initiator is within the above-mentioned range, the curability of the composition and the solubility of the polymerization initiator tend to be further improved.

1.3. Other Additives

The radiation-curable ink jet composition according to the present embodiment may further contain additives, such as a color material, a dispersant, a polymerization inhibitor, a slipping agent, and a photosensitizer, as necessary.

1.3.1. Color Material

The radiation-curable ink jet composition according to the present embodiment may further contain a color material. The radiation-curable ink jet composition according to the present embodiment can be used as a colored radiation-curable ink jet composition by containing the color material. As the color material, at least one of a pigment and a dye can be used.

The total content of the color material may be 1 to 20 mass %, 2 to 15 mass %, or 2 to 10 mass % based on the total amount of the composition. Incidentally, the radiation-curable ink jet composition according to the present embodiment may be a clear ink that does not contain a color material or contains a color material to the extent in which coloring is not intended (for example, 0.1 mass % or less).

1.3.1.1. Pigment

A use of a pigment as the color material can improve the light resistance of the radiation-curable ink jet composition. The pigment may be an inorganic pigment or an organic pigment. As the pigment, a single pigment may be used, or two or more pigments may be used.

As the inorganic pigment, carbon blacks (C.I. (Colour Index Generic Name) Pigment Black 7), such as Furnace Black, Lamp Black, Acetylene Black, and Channel Black, iron oxide, and titanium oxide can be used.

Examples of the organic pigment include azo pigments, such as insoluble azo pigments, condensed azo pigments, azo lakes, and chelate azo pigments; polycyclic pigments, such as phthalocyanine pigments, perylene and perinone pigments, anthraquinone pigments, quinacridone pigments, dioxane pigments, thioindigo pigments, isoindolinone pigments, and quinophthalone pigments; dye chelates (e.g., basic dye-type chelates and acidic pigment-type chelates); dye lakes (basic dye-type lakes and acidic dye-type lakes); nitro pigments; nitroso pigments; aniline black; and daylight fluorescent pigments.

Further specifically, examples of the carbon black used in a black composition include No. 2300, No. 900, MCF88, No. 33, No. 40, No. 45, No. 52, MA7, MA8, MA100, and No. 2200B (these products are all manufactured by Mitsubishi Chemical Corporation); Raven 5750, Raven 5250, Raven 5000, Raven 3500, Raven 1255, and Raven 700 (these products are all manufactured by Carbon Columbia); Regal 400R, Regal 330R, Regal 660R, Mogul L, Monarch 700, Monarch 800, Monarch 880, Monarch 900, Monarch 1000, Monarch 1100, Monarch 1300, and Monarch 1400 (these products are all manufactured by Cabot JAPAN K.K.); and Color Black FW1, Color Black FW2, Color Black FW2V, Color Black FW18, Color Black FW200, Color Black S150, Color Black 5160, Color Black 5170, Printex 35, Printex U, Printex V, Printex 140U, Special Black 6, Special Black 5, Special Black 4A, and Special Black 4 (these products are all manufactured by Degussa-Huls AG).

Examples of the pigment used in a white composition include C.I. Pigment White 6, 18, and 21.

Examples of the pigment used in a yellow composition include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, and 180.

Examples of the pigment used in a magenta composition include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245; and C.I. Pigment Violet 19, 23, 32, 33, 36, 38, 43, and 50.

Examples of the pigment used in a cyan composition include C.I. Pigment Blue 1, 2, 3, 15, 15:1, 15:2, 15:3, 15:34, 15:4, 16, 18, 22, 25, 60, 65, and 66; and C.I. Vat Blue 4 and 60.

Examples of pigments other than magenta, cyan, and yellow pigments include C.I. Pigment Green 7 and 10; C.I. Pigment Brown 3, 5, 25, and 26; and C.I. Pigment Orange 1, 2, 5, 7, 13, 14, 15, 16, 24, 34, 36, 38, 40, 43, and 63.

The pigment may be a non-metallic pigment, such as a carbon black or an organic pigment, because its storage stability is high.

The content of the pigment may be 1 to 20 mass %, 2 to 15 mass %, or 2 to 10 mass % based on the total amount of the composition.

1.3.1.2. Dye

As the color material, a dye can be used. As the dye, an acidic dye, a direct dye, a reactive dye, or a basic dye can be used without limitation. As the dye, a single dye may be used, or two or more dyes may be used.

The dye is not particularly limited, and examples thereof include C.I. Acid Yellow 17, 23, 42, 44, 79, and 142; C.I. Acid Red 52, 80, 82, 249, 254, and 289; C.I. Acid Blue 9, 45, and 249; C.I. Acid Black 1, 2, 24, and 94; C.I. Food Black 1 and 2; C.I. Direct Yellow 1, 12, 24, 33, 50, 55, 58, 86, 132, 142, 144, and 173; C.I. Direct Red 1, 4, 9, 80, 81, 225, and 227; C.I. Direct Blue 1, 2, 15, 71, 86, 87, 98, 165, 199, and 202; C.I. Direct Black 19, 38, 51, 71, 154, 168, 171, and 195; C.I. Reactive Red 14, 32, 55, 79, and 249; and C.I. Reactive Black 3, 4, and 35.

1.3.2. Dispersant

When the radiation-curable ink jet composition includes a pigment, the composition may further contain a dispersant for further improving the pigment dispersibility. As the dispersant, a single dispersant may be used, or two or more dispersants may be used.

The dispersant is not particularly limited, and examples thereof include dispersants that are commonly used for preparing pigment dispersions, such as polymer dispersants. Specifically, examples thereof include those whose main component is at least one selected from polyoxyalkylene polyalkylene polyamines, vinyl polymers and copolymers, acrylic polymers and copolymers, polyesters, polyamides, polyimides, polyurethanes, amino polymers, silicon-containing polymers, sulfur-containing polymers, fluorine-containing polymers, and epoxy resins.

Examples of commercial products of the polymer dispersant include AJISPER series manufactured by Ajinomoto Fine-Techno Co., Ltd., Solsperse series (such as Solsperse 36000) available from Avecia or Noveon, Inc., DISPERBYK series manufactured by BYK Additives & Instruments, and DISPARLON series manufactured by Kusumoto Chemicals, Ltd.

The content of the dispersant may be 0.1 to 2 mass %, 0.1 to 1 mass %, or 0.1 to 0.5 mass % based on the total amount of the composition.

1.3.3. Polymerization Inhibitor

The radiation-curable ink jet composition according to the present embodiment may further contain a polymerization inhibitor. As the polymerization inhibitor, a single polymerization inhibitor may be used, or two or more polymerization inhibitors may be used.

Examples of the polymerization inhibitor include, but not limited to, p-methoxyphenol, hydroquinone methyl ether (MEHQ), 4-hydroxy-2,2,6,6-tetramethylpiperidine-N-oxyl, hydroquinone, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol), 4,4'-thiobis(3-methyl-6-t-butylphenol), and hindered amine compounds.

The content of the polymerization inhibitor may be 0.05 to 1 mass % or 0.05 to 0.5 mass % based on the total amount of the composition.

1.3.4. Slipping Agent

The radiation-curable ink jet composition according to the present embodiment may further contain a slipping agent. As the slipping agent, a single slipping agent may be used, or two or more slipping agents may be used.

The slipping agent may be a silicone surfactant, in particular, polyester-modified silicone or polyether-modified silicone. Examples of the polyether-modified silicone include BYK-378, 3455, BYK-UV 3500, 3510, and 3530 (these products are all manufactured by BYK Additives & Instruments). Examples of the polyester-modified silicone include BYK-3570 (manufactured by BYK Additives & Instruments).

The content of the slipping agent may be 0.01 to 2 mass % or 0.05 to 1 mass % based on the total amount of the composition.

1.3.5. Photosensitizer

The radiation-curable ink jet composition according to the present embodiment may further contain a photosensitizer. Examples of the photosensitizer include amine compounds (e.g., an aliphatic amine, an amine having an aromatic group, piperidine, a reaction product of an epoxy resin and an amine, and triethanolamine triacrylate), urea compounds (e.g., allylthiourea and o-tolylthiourea), sulfur compounds (e.g., sodium diethyl dithiophosphate and a soluble salt of aromatic sulfinic acid), nitrile compounds (e.g., N,N-diethyl-p-aminobenzonitrile), phosphorus compounds (e.g., tri-n-butylphosphine and sodium diethyl dithiophosphide), nitrogen compounds (e.g., Michler's ketone, an N-nitrosohydroxylamine derivative, an oxazolidine compound, a tetrahydro-1,3-oxazine compound, a condensate of formaldehyde or acetaldehyde and diamine), and chlorine compounds (e.g., carbon tetrachloride and hexachloroethane).

1.4. Physical Properties

The radiation-curable ink jet composition according to the present embodiment may have a viscosity at 20° C. of 25 mPa·s or less or 5 to 25 mPa·s. When the composition has a viscosity at 20° C. within the above-mentioned range, an appropriate amount of the composition can be discharged from a nozzle, and the flying curving and scattering of the composition can be further reduced. Accordingly, the composition can be suitably used in an ink jet recording apparatus. Incidentally, the viscosity can be measured using a viscoelastometer MCR-300 (manufactured by Pysica) at 20° C. by increasing the shear rate from 10 to 1000 and reading the viscosity at a shear rate of 200.

The radiation-curable ink jet composition according to the present embodiment may have a surface tension at 20° C. of 20 mN/m or more and 40 mN/m or less. When the radiation-curable ink jet composition has a surface tension at 20° C. within the above-mentioned range, the composition hardly wets the nozzle surface subjected to liquid repellent treatment. Consequently, an appropriate amount of the composition is normally discharged from the nozzle, and the flying curving and scattering of the composition can be further reduced. Accordingly, the composition can be suitably used in an ink jet recording apparatus. Incidentally, the surface tension can be measured by verifying the surface tension when a platinum plate is wetted with the radiation-curable ink jet composition at 20° C. using an automatic surface tensiometer CBVP-Z (manufactured by Kyowa Interface Science Co., Ltd.).

1.5. Method for Manufacturing Composition

The radiation-curable ink jet composition is manufactured (prepared) by mixing and stirring the respective components to be contained in the composition to be sufficiently uniform. In the present embodiment, the preparation of the radiation-curable ink jet composition may include a step of subjecting a mixture obtained by mixing a polymerization initiator and at least a prat of monomers to ultrasonication and/or warming treatment in the preparation process. Consequently, the amount of dissolved oxygen in the prepared composition can be decreased, and the radiation-curable ink jet composition can have excellent discharge stability and storage stability. The mixture may further contain other components of the radiation-curable ink jet composition, as long as the above-mentioned components are contained, or may contain all components of the radiation-curable ink jet composition. The monomer component contained in the mixture may be at least part of the monomers of the radiation-curable ink jet composition.

2. Ink Jet Recording Method

The ink jet recording method according to the present embodiment includes a discharge step of discharging the radiation-curable ink jet composition from an ink jet head to adhere the composition to a recording medium and an irradiation step of irradiating the radiation-curable ink jet composition adhered to the recording medium with radioactive rays. Consequently, a coating film can be formed on the area, to which the radiation-curable ink jet composition has been applied, of the recording medium. Each step will now be described in detail.

2.1. Discharge Step

In the discharge step, the composition is discharged from an ink jet head and adheres to a recording medium. More specifically, a pressure-generating unit is driven to discharge the composition filling a pressure-generating chamber of the ink jet head from a nozzle. This discharge method is also referred to as an ink jet method.

Examples of the ink jet head that is used in the discharge step include line heads that perform recording by a line system and serial heads that perform recording by a serial system.

In the line system using a line head, for example, an ink jet head having a width not narrower than the recording width of a recording medium is fixed to a recording apparatus. A recording medium is moved along the sub scanning direction (the vertical direction or the transportation direction of the recording medium), and an ink droplet is discharged from a nozzle of the ink jet head in conjunction with the movement to record an image on the recording medium.

In the serial system using a serial head, for example, an ink jet head is mounted on a carriage that is movable in the width direction of a recording medium. The carriage is moved along the main scanning direction (the horizontal direction or the width direction of the recording medium), and an ink droplet is discharged from a nozzle opening of the head in conjunction with the movement to record an image on the recording medium.

2.2. Irradiation Step

In the irradiation step, the radiation-curable ink jet composition adhered to the recording medium is irradiated with radioactive rays. Polymerization of monomers is initiated by the irradiation with radioactive rays to cure the composition, resulting in formation of a coating film. On this occasion, if a polymerization initiator is present, active species (initiating species), such as radicals, acids, and bases, are generated, and the polymerization of monomers is promoted by the function of the initiating species. In addition, if a photosensitizer is present, the photosensitizer absorbs radioactive rays to become an excited state and comes into contact with the polymerization initiator to promote the decomposition of the polymerization initiator. Consequently, it is possible to further achieve the curing reaction.

Here, examples of the radioactive rays include ultraviolet rays, infrared rays, visible rays, and X-rays. The radiation source is disposed downstream the ink jet head and irradiates the composition. The radiation source is not particularly limited, and examples thereof include a UV-LED. The use of such a radiation source can achieve downsizing the apparatus and a reduction in cost. Since the UV-LED as a ultraviolet ray source is small sized, it can be attached to the inside of the ink jet recording apparatus.

For example, the UV-LED can be attached to the carriage (both ends along the medium width direction and/or the medium transporting direction side) on which the ink jet head that discharges the radiation-curable ink jet composition is mounted. Furthermore, curing can be achieved with low energy at a high speed due to the above-described composition of the radiation-curable ink jet composition. The irradiation energy is calculated by multiplying the irradiation time by the irradiation intensity. Accordingly, the irradiation time can be shortened, and the printing speed is increased. Alternatively, the irradiation intensity can also be decreased. Consequently, an increase in the temperature of printed matter can be decreased, which also leads to a decrease in the odor of the cured film.

3. Recorded Matter

The recorded matter of the present embodiment is made of the radiation-curable ink jet composition adhered on a recording medium and cured thereon. Since the composition has good flexibility and adhesion, cracking and chipping of the coating film can be prevented during post processing. Accordingly, the recorded matter of the present embodiment can be used in, for example, sign application.

The material of the recording medium is not particularly limited, and examples thereof include plastics, such as polyvinyl chloride, polyethylene terephthalate, polypropylene, polyethylene, polycarbonate, cellulose diacetate, cellulose triacetate, cellulose propionate, cellulose butyrate, cellulose acetate butyrate, cellulose nitrate, polystyrene, and polyvinylacetal, and these plastics whose surfaces are processed; glass; paper; metals; and wood.

In addition, the recording medium may have any shape. Examples of the shape include a film, a board, and cloth.

Examples

The present disclosure will now be more specifically described by examples but is not limited to the following examples.

1. Preparation of Ink Jet Composition

A color material, a dispersant, and a part of each monomer were weighed and put in a pigment dispersion tank of a bead mill, ceramic beads with a diameter of 1 mm were put in the tank, and stirring was performed to prepare a pigment dispersion in which the color material was dispersed in the monomer. Subsequently, the remaining monomers, a polymerization initiator, and a polymerization inhibitor were put in a mixture tank made of stainless steel to give the composition shown in Table 1 and were mixed and stirred to be completely dissolved. The pigment dispersion prepared above was then added to the mixture tank, followed by further mixing and stirring at an ordinary temperature for 1 hour and further filtration through a membrane filter of pore size 5 μm to obtain the radiation-curable ink jet composition of each example. Incidentally, the numerical value of each component of each example shown in the table represents mass % unless otherwise specified.

The abbreviations and product components used in Table 1 are as shown.

Monofunctional Monomer

PEA (trade name: "Viscoat #192", manufactured by Osaka Organic Chemical Industry Ltd., phenoxyethyl acrylate)

NVC (manufactured by ISP Japan Ltd., N-vinylcaprolactam)

ACMO (manufactured by KJ Chemicals Corporation, acryloylmorpholine)

TBCHA (trade name: "SR217", manufactured by Sartomer, tert-butylcyclohexanol acrylate)

IBXA (manufactured by Osaka Organic Chemical Industry Ltd., isobornyl acrylate)

DCPA (manufactured by Hitachi Chemical Co., Ltd., dicyclopentenyl acrylate) Multifunctional monomer VEEA (manufactured by Nippon Shokubai Co., Ltd., 2-(2-vinyloxyethoxy)ethyl acrylate oligomer)

CN991 (manufactured by Sartomer, difunctional urethane acrylate oligomer) Polymerization initiator Irg. 819 (trade name: "IRGACURE 819", manufactured by BASF SE, bis(2,4,6-trimethylbenzoyl)-phenylphosphine oxide)

TABLE 1

| | | | Tg (°C.) | Example 1 | 2 | 3 | 4 | 5 | 6 | 7 | 8 | 9 | 10 | 11 | Comparative Example 1 | 2 | 3 | 4 |
|---|---|---|---|---|---|---|---|---|---|---|---|---|---|---|---|---|---|---|
| Composition (mass %) | Monofunctional monomer | PEA | −22 | 42.0 | 38.1 | 35.9 | 30.6 | 34.1 | 34.7 | 28.6 | 30.6 | 33.6 | 34.6 | 37.6 | 38.6 | 30.6 | 34.6 | 45.0 |
| | | NVC | 90 | 0.0 | 0.0 | 0.0 | 12.0 | 4.0 | 0.0 | 0.0 | 4.0 | 0.0 | 0.0 | 0.0 | 27.0 | 0.0 | 27.0 | 0.0 |
| | | ACMO | 145 | 12.0 | 12.0 | 12.0 | 0.0 | 8.0 | 8.0 | 14.0 | 8.0 | 12.0 | 2.0 | 12.0 | 12.0 | 12.0 | 0.0 | 12.0 |
| | | TBCHA | 38 | 3.6 | 0.0 | 0.0 | 0.0 | 0.0 | 0.0 | 0.0 | 0.0 | 3.0 | 0.0 | 0.0 | 3.0 | 0.0 | 3.0 | 3.6 |
| | | IBXA | 94 | 0.0 | 24.5 | 25.7 | 26.0 | 26.0 | 28.9 | 26.0 | 26.0 | 30.0 | 21.0 | 26.0 | 0.0 | 19.0 | 3.0 | 0.0 |
| | | DCPA | 110 | 23.0 | 4.0 | 5.0 | 10.0 | 6.5 | 7.0 | 10.0 | 10.0 | 0.0 | 23.0 | 6.0 | 0.0 | 0.0 | 13.0 | 20.0 |
| | Multifunctional monomer | VEEA | 39 | 1.0 | 3.0 | 3.0 | 3.0 | 3.0 | 3.0 | 3.0 | 3.0 | 3.0 | 1.0 | 0.0 | 1.0 | 20.0 | 1.0 | 1.0 |
| | Oligomer | CN991 | 27 | 5.6 | 5.6 | 5.6 | 5.6 | 5.6 | 5.6 | 5.6 | 5.6 | 5.6 | 5.6 | 5.6 | 5.6 | 5.6 | 5.6 | 5.6 |
| | Polymerization initiator | Irg. 819 | — | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| | | TPO | — | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| | Polymerization inhibitor | MEHQ | — | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | Slipping agent | BYK-UV3500 | — | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| | Pigment | Carbon black | — | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| | Dispersant | solsperse 36000 | — | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| Physical properties | Proportion (mass %) of monofunctional monomer to polymerizable compound | | — | 92.4 | 90.1 | 90.1 | 90.1 | 90.1 | 90.1 | 90.1 | 90.1 | 90.1 | 92.4 | 93.6 | 92.4 | 70.6 | 92.4 | 92.4 |
| | Proportion (mass %) of nitrogen-containing monofunctional monomer to composition | | — | 12.0 | 12.0 | 12.0 | 12.0 | 12.0 | 8.0 | 14.0 | 12.0 | 12.0 | 2.0 | 12.0 | 39.0 | 12.0 | 27.0 | 12.0 |
| | Weighted average temperature (°C.) of glass transition temperatures | | — | 42 | 45 | 48 | 48 | 48 | 48 | 60 | 53 | 48 | 48 | 48 | 42 | 43 | 42 | 38 |
| Evaluation items | Curability | | — | B | B | B | B | B | B | B | B | B | C | B | A | B | B |
| | L* (Color development index) | | | 12 | 12 | 12 | 15 | 14 | 12 | 12 | 14 | 12 | 12 | 12 | 22 | 12 | 19 | 12 |
| | Odor | | | B | B | B | C | C | C | C | C | C | D | C | A | B | B | B |
| | Flexibility | | — | A | A | A | A | A | A | A | A | A | A | A | A | D | A | A |
| | Adhesion | | — | A | A | A | A | A | A | A | B | A | A | A | A | D | A | A |
| | Scratch resistance | | — | C | C | B | B | B | B | A | B | A | B | B | C | A | C | D |

TPO (trade name: "IRGACURE TPO", manufactured by BASF SE, 2,4,6-trimethylbenzoyl diphenylphosphine oxide)

Polymerization Inhibitor

MEHQ (trade name: "p-Methoxyphenol", manufactured by Kanto Chemical Co., Inc., hydroquinone monomethyl ether) Slipping agent BYK-UV 3500 (manufactured by BYK Additives & Instruments, polyether-modified polydimethylsiloxane having an acryloyl group)

Color Material (Pigment)

Carbon black (trade name: "MA-100", manufactured by Mitsubishi Chemical Corporation)

Dispersant

Solsperse 36000 (manufactured by The Lubrizol Corporation, polymer dispersant)

In Table 1, "Proportion (mass %) of monofunctional monomer to polymerizable compound" refers to the content of the monofunctional monomer component based on the total amount of the polymerizable compound component. The polymerizable compound specifically refers to the monofunctional monomer, the multifunctional monomer, and the oligomer in Table 1.

In Table 1, "Proportion (mass %) of nitrogen-containing monofunctional monomer to composition" refers to the content of a nitrogen-containing monofunctional monomer component based on the total amount of the ink composition.

In Table 1, "Weighted average temperature (° C.) of glass transition temperatures" in the column of physical properties refers to the weighted average of glass transition temperatures of homopolymers of the respective polymerizable compounds when the mass ratios of the contents of the respective polymerizable compounds are weighted.

2. Evaluation Method 2.1. Curability

Cotton swab-weighted tacking properties were evaluated. Specifically, an ink composition was applied onto a PVC medium with a bar coater such that the coating thickness was 10 μm, and was irradiated with ultraviolet rays at a predetermined irradiation intensity at a rate of 0.04 sec/cm. On this occasion, as the light source, LEDs having a peak wavelength of 395 nm were used. Subsequently, the coating film surface was rubbed with a cotton swab, and the curability was evaluated based on the irradiation intensity at which the swab was not stained. The evaluation criteria are as follows:

A: the irradiation intensity is less than 0.5 W/cm$^2$,
B: the irradiation intensity is 0.5 W/cm$^2$ or more and less than 1.1 W/cm$^2$,
C: the irradiation intensity is 1.1 W/cm$^2$ or more and less than 2.5 W/cm$^2$, and
D: the irradiation intensity is 2.5 W/cm$^2$ or more.

2.2. Color Development Properties

The coating films obtained in the above-described evaluation of curability were subjected to measurement of the L* value using a colorimeter (trade name: "Gretag Macbeth Spectrolino", manufactured by X-RITE Inc.). Incidentally, the coating films that had been cured were used for the measurement. When the L* value is 15 or less, it can be judged that good color development properties have been obtained.

2.3. Odor

The odor intensity of each radiation-curable ink jet composition was determined in accordance with JIS K 0102. More specifically, a sample was added to water maintained at 40° C., and the dilution multiple when an odor was clearly felt, that is, the dilution multiple of the odor threshold was obtained. Incidentally, in order to reduce individual differences in olfaction, each single sample was examined by at least 10 individuals. Based on the resulting value, odor was evaluated by the following evaluation criteria:

Evaluation Criteria

A: 0 or more and less than 2,
B: 2 or more and less than 3,
C: 3 or more and less than 4, and
D: 4 or more.

2.4. Evaluation of Flexibility

Each radiation-curable ink jet composition was applied onto a vinyl chloride film (JT5829R, manufactured by MACtac LLC) with a bar coater such that the coating thickness was 10 μm, and was then cured using a metal halide lamp (manufactured by Eye Graphics Co., Ltd.) at an energy of 400 mJ/cm$^2$ to form a coating film. The vinyl chloride film as release paper on which the coating film was formed was peeled off, and the coating film was cut into a strip shape having a width of 1 cm and a length of 8 cm to prepare a test piece. The elongation percentage as the flexibility of each test piece was measured using a tension tester (TENSILON, manufactured by ORIENTEC Corporation). The elongation percentage was the value at the time when a crack occurred by pulling the test piece at 5 mm/min. The value was calculated by [(length at cracking)−(length before elongation)]/(length before elongation)×100. The evaluation criteria are shown below.

Evaluation Criteria

A: 300% or more,
B: 250% or more and less than 300%,
C: 200% or more and less than 250%, and
D: less than 200%.

2.5. Evaluation of Adhesion

Cured coating films were formed on recording media as in the evaluation of flexibility except that a polypropylene board (manufactured by Coroplast S/A) and a polyethylene terephthalate film (manufactured by Toray Industries, Inc.) were used as the recording media. The resulting coating films were subjected to evaluation by a cross-cut test in accordance with JIS K5600-5-6.

More specifically, a cutting tool (cutter) was placed on a coating film such that the blade of the cutting tool was perpendicular to the coating film, and a grid of 10×10 squares was made by cutting at a distance of 1 mm between cuts. Transparent adhesive tape (width: 25 mm) with a length of about 75 mm was attached to the grid and was sufficiently rubbed with a finger so that the cured film could be seen through the tape. Subsequently, within 5 minutes after the adhesion, the tape was reliably peeled off from the cured film at an angle of approximately 60° for 0.5 to 1.0 seconds, and the condition of the grid was visually verified. The evaluation criteria are as follows.

Evaluation Criteria

A: no peeling of the cured film was observed in the grid in both the polypropylene film and the polyethylene terephthalate film, B: peeling of the cured film was observed in less than 50% of the grid in one of the polypropylene film and the polyethylene terephthalate film, C: peeling of the cured film was observed in less than 50% of the grid in each of the polypropylene film and the polyethylene terephthalate film, D: peeling of the cured film was observed in 50% or more of the grid in one of the polypropylene film and the polyethylene terephthalate film, and E: peeling of the cured film was observed in 50% or more of the grid in each of the polypropylene film and the polyethylene terephthalate film.

2.6. Evaluation of Scratch Resistance

The cured coating films produced in the evaluation of flexibility were subjected to evaluation by a micro-scratch test in accordance with JIS R3255. In the measurement, the withstand load as the scratch resistance was measured using a nano-layer scratch tester (CSR-5000, manufactured by Nanotec Corporation). Microscratching was performed while applying a load, and the load when a probe reached the surface of a medium was defined as the withstand load. A higher withstand load means more excellent scratch resistance. In the measurement, the probe stylus diameter was 15 μm, the amplitude was 100 μm, and the scratching rate was 10 μm/sec. The evaluation criteria are as follows.

Evaluation Criteria

A: 30 mN/cm² or more,
B: 25 mN/cm² or more and less than 30 mN/cm²,
C: 20 mN/cm² or more and less than 25 mN/cm², and
D: less than 20 mN/cm².

Each of the radiation-curable ink jet compositions was loaded into an ink jet printer PX-G930 (Seiko Epson Corporation), and recording was performed. It was confirmed that ink jet discharge of the respective radiation-curable ink jet compositions was possible and that images could be formed.

3. Evaluation Results

The compositions and evaluation results of the radiation-curable ink jet compositions used in each example are shown in Table 1. As shown in Table 1, in the radiation-curable ink jet compositions of Examples 1 to 11, in which the content of the monofunctional monomer component was 87 mass % or more based on the total amount of the polymerizable compound component, the monofunctional monomer component included a nitrogen-containing monofunctional monomer component, the content of the nitrogen-containing monofunctional monomer component was 14 mass % or less based on the total amount of the radiation-curable ink jet composition, and the weighted average of the glass transition temperatures of homopolymers of the respective polymerizable compounds was 42° C. or more when the mass ratios of the contents of the respective polymerizable compounds were weighted, the flexibility, the adhesion, and the scratch resistance were all evaluated as "C" or higher, and the color development properties were also good.

For details, comparison of each Example with Comparative Examples 1 and 3 demonstrates that the color development properties are improved when the proportion of the nitrogen-containing monofunctional monomer component to the composition is 14 mass % or less. In addition, comparison of each Example with Comparative Example 2 demonstrates that the flexibility and the adhesion are improved when the proportion of the monofunctional monomer component to the polymerizable compound component is 87 mass % or more. Furthermore, comparison of each Example with Comparative Example 4 demonstrates that the scratch resistance is improved when the weighted average of glass transition temperatures is 42° C. or more.

What is claimed is:

1. A radiation-curable ink jet composition comprising:
   a polymerizable compound component containing a monofunctional monomer component and a multifunctional monomer component,
   wherein a content of the monofunctional monomer component is 87 mass % or more based on the total amount of the polymerizable compound component;
   the monofunctional monomer component includes a nitrogen-containing monofunctional monomer component;
   a content of the nitrogen-containing monofunctional monomer component is 14 mass % or less based on total amount of the radiation-curable ink jet composition;
   the multifunctional monomer component includes a vinyl ether group-containing (meth)acrylic ester represented by the following formula (1):

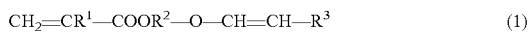

$$CH_2=CR^1-COOR^2-O-CH=CH-R^3 \qquad (1)$$

(where, $R^1$ is a hydrogen atom or a methyl group, $R^2$ is a divalent C2-C20 organic residue, and $R^3$ is a hydrogen atom or a monovalent C1-C11 organic residue); and
   a weighted average of glass transition temperatures of homopolymers of the respective polymerizable compounds is 42° C. or more when mass ratios of contents of the respective polymerizable compounds are weighted.

2. The radiation-curable ink jet composition according to claim 1, wherein
   the nitrogen-containing monofunctional monomer component includes a monomer having a nitrogen-containing heterocyclic structure.

3. The radiation-curable ink jet composition according to claim 1, wherein
   a content of the multifunctional monomer component is 1 to 10 mass % based on the total amount of the polymerizable compound component.

4. The radiation-curable ink jet composition according to claim 1, wherein
   the content of the nitrogen-containing monofunctional monomer component is 3 to 14 mass % based on the total amount of the radiation-curable ink jet composition.

5. The radiation-curable ink jet composition according to claim 1, wherein
   the nitrogen-containing monofunctional monomer component includes a nitrogen-containing monofunctional acrylate monomer.

6. The radiation-curable ink jet composition according to claim 1, wherein
   the nitrogen-containing monofunctional monomer component includes a nitrogen-containing monofunctional vinyl monomer.

7. The radiation-curable ink jet composition according to claim 1, wherein
   the monofunctional monomer component includes a monofunctional acrylate containing a polycyclic hydrocarbon group.

8. The radiation-curable ink jet composition according to claim 7, wherein
   a content of the monofunctional acrylate containing a polycyclic hydrocarbon group is 40 mass % or less based on the total amount of the radiation-curable ink jet composition.

9. The radiation-curable ink jet composition according to claim 1, comprising:
   a pigment.

10. A recording method comprising:
discharging the radiation-curable ink jet composition according to claim 1 from an ink jet head to adhere the composition to a recording medium; and
irradiating the radiation-curable ink jet composition adhered to the recording medium with radioactive rays.

\* \* \* \* \*